(12) United States Patent
Liu et al.

(10) Patent No.: US 8,588,856 B2
(45) Date of Patent: Nov. 19, 2013

(54) ANTENNA SYSTEM AND BASE STATION SYSTEM

(71) Applicant: Huawei Technologies Co., Ltd., Guangdong (CN)

(72) Inventors: Dezheng Liu, Shanghai (CN); Tao Pu, Shanghai (CN); Weihua Sun, Shenzhen (CN); Zuojun Qin, Shanghai (CN); Pinghua He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/718,976

(22) Filed: Dec. 18, 2012

(65) Prior Publication Data

US 2013/0252671 A1 Sep. 26, 2013

Related U.S. Application Data

(63) Continuation of application No. PCT/CN2012/072604, filed on Mar. 20, 2012.

(51) Int. Cl.
H04M 1/00 (2006.01)
(52) U.S. Cl.
USPC ..................................... 455/562.1; 455/277.1
(58) Field of Classification Search
USPC ........ 455/550.1, 560, 561, 562.1, 575.1, 101, 455/129, 277.1, 277.2; 370/278, 329
See application file for complete search history.

(56) References Cited

U.S. PATENT DOCUMENTS

| 6,889,061 | B2 * | 5/2005 | Shapira et al. ............. 455/562.1 |
| 7,130,663 | B2 * | 10/2006 | Guo ........................... 455/562.1 |
| 2004/0204109 | A1 | 10/2004 | Hoppenstein |
| 2009/0075701 | A1 * | 3/2009 | Haskell et al. ............. 455/562.1 |
| 2012/0014697 | A1 | 1/2012 | Zhao et al. |
| 2013/0044650 | A1 * | 2/2013 | Barker et al. ................. 370/278 |

FOREIGN PATENT DOCUMENTS

| CN | 1503587 A | 6/2004 |
| CN | 101426303 A | 5/2009 |
| EP | 1206050 A1 | 5/2002 |
| WO | WO 2007/004048 A1 | 1/2007 |
| WO | WO 2010/135862 A1 | 12/2010 |

OTHER PUBLICATIONS

International Search Report and Written Opinion in corresponding International Patent Application No. PCT/CN2012/072604 (Jan. 3, 2013).

* cited by examiner

Primary Examiner — Thanh Le
(74) Attorney, Agent, or Firm — Leydig, Voit & Mayer, Ltd.

(57) ABSTRACT

An antenna system is disclosed. In the antenna system, a first antenna element array includes multiple antenna elements, where the antenna elements are configured to receive and transmit signals in two different polarization directions; the first combiner-splitter is configured to combine signals, received by the multiple antenna elements; the active module is configured to receive combined signals in the two different polarization directions, and perform frequency translation on the combined signals to obtain baseband signals; at least one pair of receiving channels in the antenna system corresponds to a second antenna apparatus, and are configured to receive signals output by the second antenna apparatus in the two different polarization directions; and the active module is further configured to perform frequency translation on the signals received by the at least one pair of receiving channels to obtain baseband signals. In this way, the network performance gain is improved.

20 Claims, 5 Drawing Sheets ns a continuation of International Patent
ANTENNA SYSTEM AND BASE STATION SYSTEM

CROSS-REFERENCE TO RELATED APPLICATIONS

This application is a continuation of International Patent Application No. PCT/CN2012/072604, filed on Mar. 20, 2012, which is hereby incorporated by reference in its entirety.

FIELD OF THE INVENTION

The present invention relates to the field of communications technologies, and in particular, to an antenna system, a base station system, and a communication system.

BACKGROUND OF THE INVENTION

In a radio distributed base station system, a remote radio unit (Radio Remote Unit, RRU) may be connected to a passive antenna. Currently, the evolution trend of the radio distributed base station system is to integrate the RRU with the antenna. That is, the RRU and the antenna form a whole. An active antenna system (Active Antenna System, AAS) architecture is an integrated antenna architecture.

An antenna system in the prior art is shown in FIG. 1. The antenna system includes two antenna element arrays. In both antenna element arrays, every element serves to both transmit and receive signals. One antenna element array 1 is connected to an active component, namely, a transceiver (Transceiver) 2, to form an active antenna architecture and implement 2-transmitter 2-receiver (2T2R); and the other array element array 3 is connected to the RRU, and is a passive antenna. The prior art supports the receiving performance gain of two channels, namely, the receiving performance gain of 2R, but the network performance gain is inferior.

SUMMARY OF THE INVENTION

The present invention discloses an antenna system, a base station system, and a communication system to improve the network performance gain.

In one aspect, an antenna system provided in an embodiment of the present invention includes:

a first antenna apparatus, at least one second antenna apparatus, and at least one pair of receiving channels;

The first antenna apparatus includes: a first antenna element array, a first combiner-splitter, and an active module; the second antenna apparatus includes: a second antenna element array and a second combiner-splitter;

Each of the first antenna element array and the second antenna element array includes a plurality of antenna elements, where the antenna elements are configured to receive and transmit signals in two different polarization directions;

The first combiner-splitter is configured to combine, in the two different polarization directions, signals, where the signals are received by the plurality of antenna elements in the first antenna element array;

The active module is configured to receive signals combined by the first combiner-splitter in the two different polarization directions, and to perform frequency translation on the signals combined by the first combiner-splitter to obtain baseband signals;

The second combiner-splitter is configured to combine, in the two different polarization directions, signals, where the signals are received by the plurality of antenna elements in the second antenna element array;

Each of the at least one second antenna apparatus corresponds to the at least one pair of receiving channels, and the at least one pair of receiving channels are configured to receive signals combined by the second combiner-splitter in the two different polarization directions; and The active module is further configured to perform frequency translation on the signals received by the at least one pair of receiving channels to obtain baseband signals.

In another aspect, a base station system provided in an embodiment of the present invention includes an antenna system;

The antenna system includes: a first antenna apparatus, at least one second antenna apparatus, and at least one pair of receiving channels;

The first antenna apparatus includes: a first antenna element array, a first combiner-splitter, and an active module; the second antenna apparatus includes: a second antenna element array and a second combiner-splitter;

Each of the first antenna element array and the second antenna element array includes a plurality of antenna elements, where the antenna elements are configured to receive and transmit signals in two different polarization directions;

The first combiner-splitter is configured to combine, in the two different polarization directions, signals, where the signals are received by the plurality of antenna elements in the first antenna element array;

The active module is configured to receive signals combined by the first combiner-splitter in the two different polarization directions, and perform frequency translation on the signals combined by the first combiner-splitter to obtain baseband signals;

The second combiner-splitter is configured to combine, in the two different polarization directions, signals, where the signals are received by the plurality of antenna elements in the second antenna element array;

Each second antenna apparatus corresponds to the at least one pair of receiving channels, and the at least one pair of receiving channels are configured to receive signals combined by the second combiner-splitter in the two different polarization directions; and The active module is further configured to perform frequency translation on the signals received by the at least one pair of receiving channels to obtain baseband signals.

In another aspect, a communication system provided in an embodiment of the present invention includes a base station system, where the base station system includes an antenna system;

The antenna system includes: a first antenna apparatus, at least one second antenna apparatus, and at least one pair of receiving channels;

The first antenna apparatus includes: a first antenna element array, a first combiner-splitter, and an active module; the second antenna apparatus includes: a second antenna element array and a second combiner-splitter;

Each of the first antenna element array and the second antenna element array includes a plurality of antenna elements, where the antenna elements are configured to receive and transmit signals in two different polarization directions;

The first combiner-splitter is configured to combine, in the two different polarization directions, signals, where the signals are received by the plurality of antenna elements in the first antenna element array;

The active module is configured to receive signals combined by the first combiner-splitter in the two different polarization directions, and perform frequency translation on the signals combined by the first combiner-splitter to obtain baseband signals;

The second combiner-splitter is configured to combine, in the two different polarization directions, signals, where the signals are received by the plurality of antenna elements in the second antenna element array;

Each second antenna apparatus corresponds to the at least one pair of receiving channels, and the at least one pair of receiving channels are configured to receive signals combined by the second combiner-splitter in the two different polarization directions; and The active module is further configured to perform frequency translation on the signals received by the at least one pair of receiving channels to obtain baseband signals.

Through the antenna system, the base station system and the communication system provided herein, in the antenna system composed of an active antenna element array and a passive antenna element array, a combiner-splitter combines signals received by the passive antenna element array in different polarization directions, and at least one pair of receiving channels are used to receive the signals, and then frequency translation is performed on the signals received by the receiving channels to obtain baseband signals. In the antenna system, the signals in different polarization directions in the passive antenna element array are received, and frequency translation is performed on the signals. Therefore, the antenna system composed of the active antenna element array and the passive antenna element array can accomplish a 4-channel receiving performance gain or more, namely, accomplish a 4R receiving performance gain or more than the 4R receiving performance gain, thereby increasing the receiving performance gain of the system.

BRIEF DESCRIPTION OF THE DRAWINGS

To illustrate the technical solutions according to the embodiments of the present invention or in the prior art more clearly, the following briefly introduces the accompanying drawings required for describing the embodiments or the prior art. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

The following describes the technical solutions in the embodiments of the present invention clearly and completely with reference to the accompanying drawings. Apparently, the described embodiments are only some exemplary embodiments of the present invention, rather than all the embodiments of the present invention. Based on the embodiments of the present invention, all other embodiments obtained by persons of ordinary skill in the art without making any creative effort shall fall within the protection scope of the present invention.

The technical solutions of the present invention are applicable to various communication systems such as a Global System for Mobile communications (GSM, Global System for Mobile communications), Code Division Multiple Access (CDMA, Code Division Multiple Access) system, Wideband Code Division Multiple Access Wireless (WCDMA, Wideband Code Division Multiple Access Wireless) system, General Packet Radio Service (GPRS, General Packet Radio Service) system, Worldwide Interoperability for Microwave Access (WiMAX, Worldwide Interoperability for Microwave Access) system, and Long Term Evolution (LTE, Long Term Evolution) system.

A base station system may include antennas and a base station. The base station may be a base transceiver station (BTS, Base Transceiver Station) in a GSM or CDMA system, or a NodeB (NodeB) in a WCDMA system, or an evolved NodeB (eNB or e-NodeB, evolved NodeB) in an LTE system. The type of base station is not limited herein.

Figure 1:
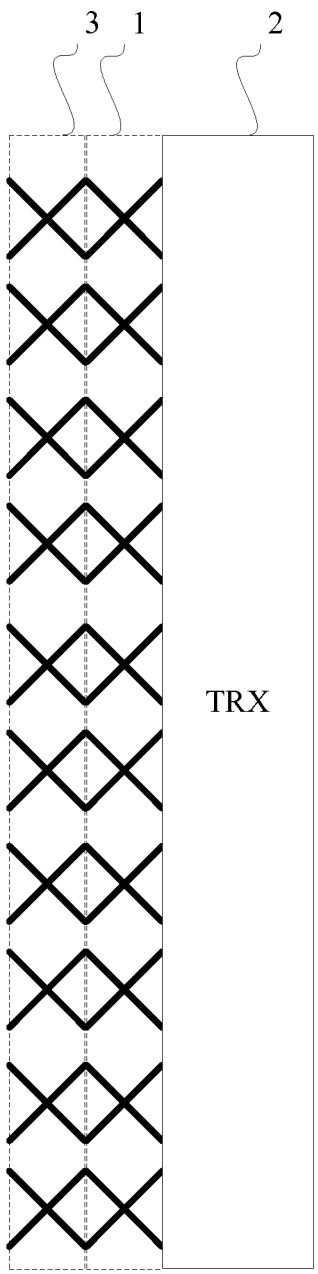
FIG. 1 is a schematic structural diagram of an antenna system in the prior art.
Figure 2:
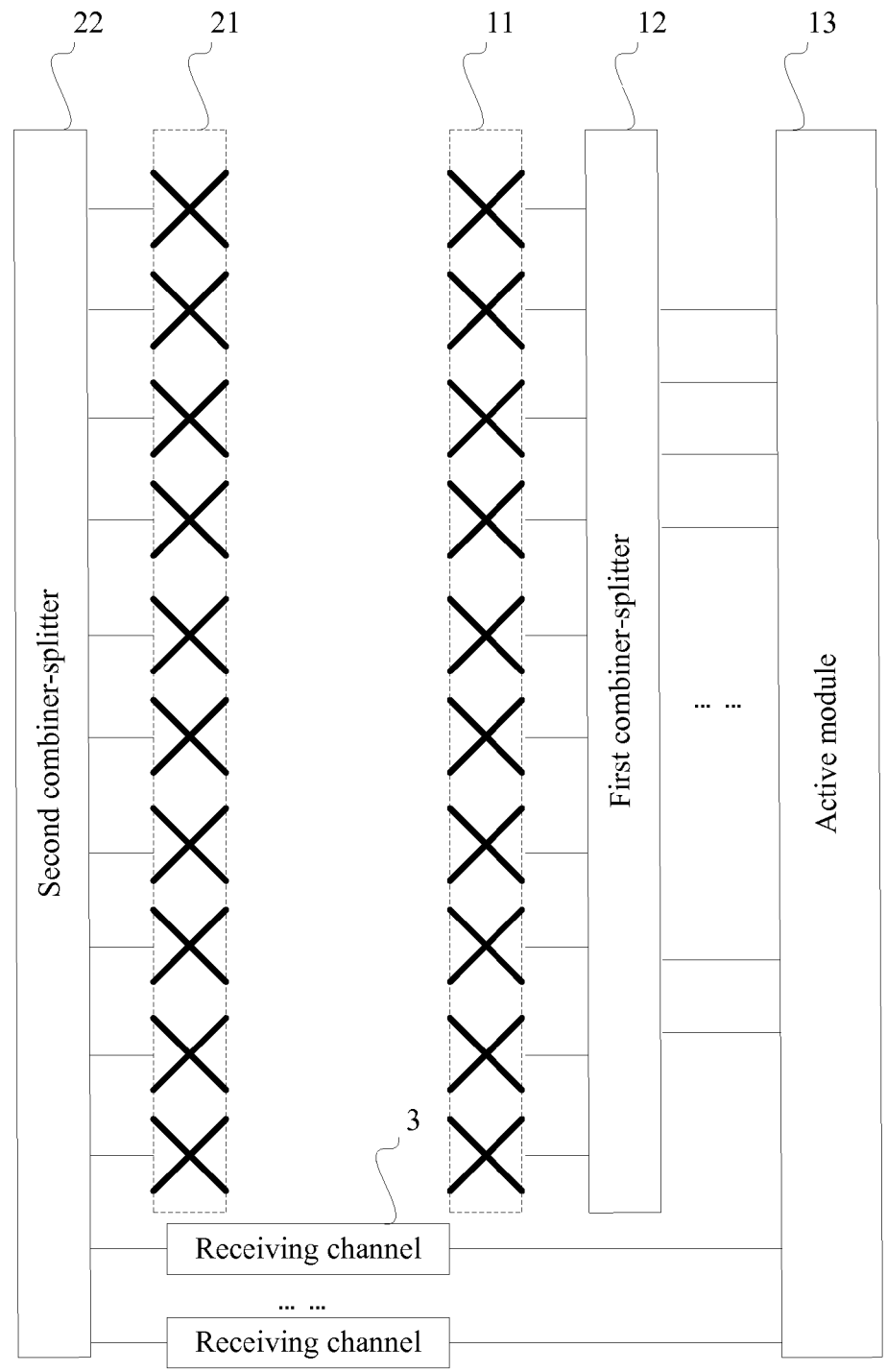
FIG. 2 is a schematic structural diagram of an antenna system according to an embodiment of the present invention.

FIG. 2 is a schematic structural diagram of an antenna system according to an embodiment of the present invention. As shown in FIG. 2, the antenna system includes: a first antenna apparatus, at least one second antenna apparatus, and at least one pair of receiving channels 3;

The first antenna apparatus includes: a first antenna element array 11, a first combiner-splitter 12, and an active module 13; the second antenna apparatus includes: a second antenna element array 21 and a second combiner-splitter 22;

The first antenna element array 11 includes multiple antenna elements, and it is the same with the second antenna element array 21, where the antenna elements are configured to receive and transmit signals in two different polarization directions;

The first combiner-splitter 12 is configured to combine, in the two different polarization directions, signals, where the signals are received by the multiple antenna elements in the first antenna element array 11;

The active module 13 is configured to receive the signals combined by the first combiner-splitter 12 in the two different polarization directions, and perform frequency translation on the signals combined by the first combiner-splitter 12 to obtain baseband signals;

The second combiner-splitter 22 is configured to combine, in the two different polarization directions, signals, where the signals are received by the multiple antenna elements in the second antenna element array 21;

Each second antenna apparatus corresponds to at least one pair of receiving channels 3, and the at least one pair of receiving channels 3 are configured to receive the signals combined by the second combiner-splitter 22 in the two different polarization directions;

The active module 13 is further configured to perform frequency translation on the signals received by the at least one pair of receiving channels 3 to obtain baseband signals.

The first antenna element array 11 includes multiple antenna elements, and it is the same with the second antenna element array 21 (each antenna element in the antenna element array is an antenna resonator); the number of antenna elements included in the first antenna element array 11 may be the same as or different from the number of antenna elements included in the second antenna element array 21. Each antenna element receives and transmits signals in two different polarization directions; all antenna elements included in the first antenna element 11 have the same two polarization directions, and all antenna elements included in the second antenna element array 21 have the same two polarization directions. For example, each antenna element in the first antenna element 11 may receive and transmit signals at a +45° angle and a −45° angle against the horizontal plane; also, each antenna element in the second antenna element 21 may receive and transmit signals at a +45° angle and a −45° angle against the horizontal plane. Besides, it should be noted that every antenna element involved herein is configured to both receive and transmit signals. That is, both the first antenna element array 11 and the second antenna element array 21 herein may employ a structure with the transmitting function and the receiving function that share an element.

Figure 3:
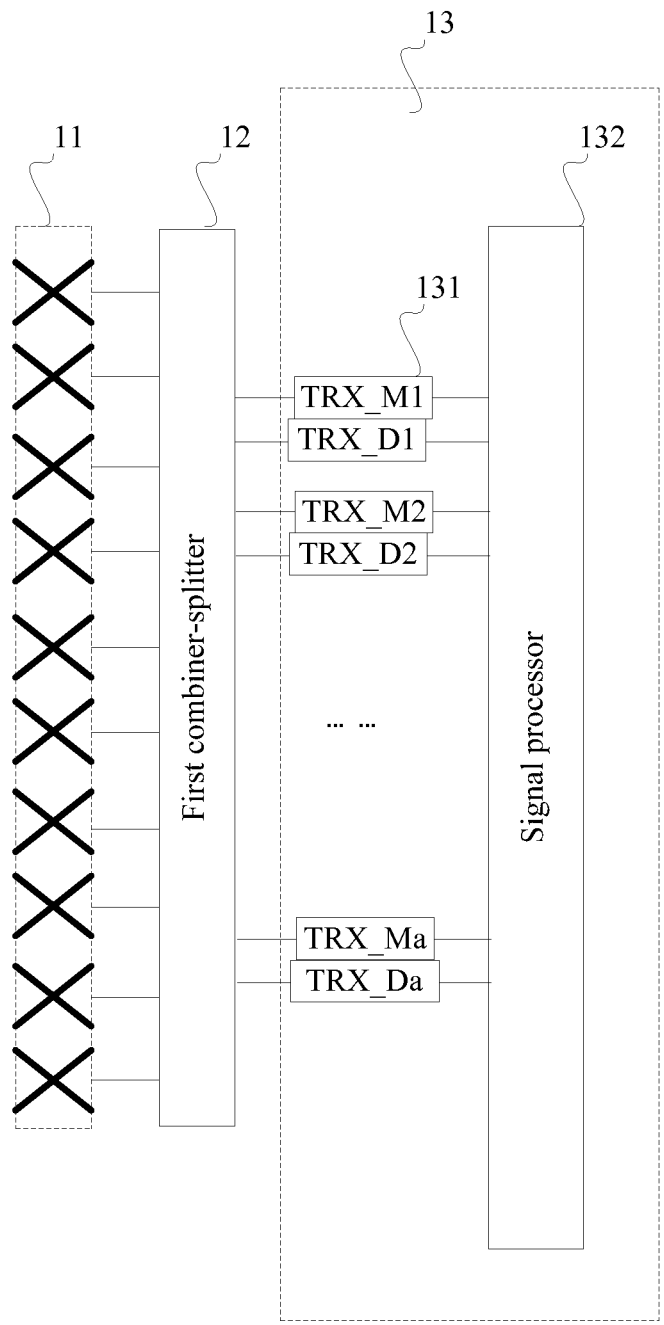
FIG. 3 is a schematic structural diagram of a first antenna apparatus according to an embodiment of the present invention.

The first antenna element array 11, the first combiner-splitter 12, and the active module 13 make up the first antenna apparatus, which is an active antenna structure. For example, the first antenna apparatus may be an AAS active antenna structure, or another existing active antenna structure. The active antenna structure can accomplish a 2-channel receiving performance gain, namely, a 2R receiving performance gain, as detailed below:

As a practicable implementation manner, an embodiment of the present invention provides a practicable structure of the first antenna apparatus. As shown in FIG. 3, in the first antenna apparatus:

The first antenna element array 11 includes: b antenna elements.

The first combiner-splitter 12 is configured to combine 2b signals received by the b antenna elements in the first antenna element array 11 into 2a signals; b signals of the 2b signals and a signals of the 2a signals correspond to one of the two different polarization directions of the b antenna elements; the other b signals and the other a signals correspond to one of the two different polarization directions of the b antenna elements, where b and a are integers greater than 1, and a is smaller than or equal to b;

The active module 13 may include: a pairs of transmitting-receiving channels 131, and a signal processor 132.

Each of the a pairs of transmitting-receiving channels 131 correspond to two signals, in two different polarization directions, of the 2a signals, and each pair of transmitting-receiving channels 131 are configured to receive two signals in two different polarization directions in the 2a signals; and The signal processor 132 is configured to perform frequency translation on the signals received by the a pairs of transmitting-receiving channels 131 and the signals received by at least one pair of receiving channels.

Specifically, the first combiner-splitter 12 may be composed of existing 2 a-to-b combining-dividing networks, or composed of one 2a-to-2b combining-dividing network. A signal received by every antenna element in the first antenna element array 11 in one polarization direction may be input into the first combiner-splitter 12 as one signal. That is, in the first antenna element array 11, a total of 2b signals are input into the first combiner-splitter 12. In the 2b signals, b signals correspond to one of the two different polarization directions of the b antenna elements, and the other b signals correspond to one of the two different polarization directions of the b antenna elements. After receiving the 2b signals, the first combiner-splitter 12 may combine the b signals, in one polarization direction, of the 2b signals into a signals and output the a signals, and combine the other b signals, in the other polarization direction, of the 2b signals into the other a signals and output the other a signals. That is, in the 2a signals obtained as a result of combining by the first combiner-splitter 12, the a signals correspond to one of the two different polarization directions of the b antenna elements, and the other a signals correspond to one of the two different polarization directions of the b antenna elements, where a and b are integers greater than 1, a is smaller than b, and the ratio of a to b is not a fixed value, and may be determined in view of a tradeoff between the performance indexes (such as the coverage performance and gain) of the antenna and the implementation costs.

Therefore, a pairs of transmitting-receiving channels 131 may be set. Each transmitting-receiving channel 131 is configured to receive one signal in the 2a signals. Therefore, the transmitting-receiving channels 131 need to be set in pairs. Each pair of transmitting-receiving channels 131 correspond to two signals, in two different polarization directions, of the 2a signals, and each pair of transmitting-receiving channels 131 are configured to receive two signals, in two different polarization directions, of the 2a signals. Therefore, a pairs of transmitting-receiving channels 131 may be set. Each of the a pairs transmitting-receiving channels 131 include a transmitting-receiving channel in an M polarization direction, expressed as TRX_M, and a transmitting-receiving channel in a D polarization direction, expressed as TRX_D, where the M polarization direction and the D polarization direction are two different polarization directions of the signals received by each antenna element in the first antenna element array 11. Therefore, the a pairs of transmitting-receiving channels 131 may be: TRX_M1 and TRX_D1, TRX_M2 and TRX_D2, . . . , TRX_Ma and TRX_Da.

Each of the a pairs of transmitting-receiving channels 131 receive two signals obtained as a result of combining by the first combiner-splitter 12, and then input them into the signal processor 132 to perform frequency translation on the signals to obtain baseband signals. It should be noted that the transmitting-receiving channel 131 mentioned herein may be an existing transmitting-receiving channel, and the existing transmitting-receiving channel 131 may perform analog-to-digital conversion and down-conversion on a received signal to obtain an intermediate-frequency signal. Therefore, in this embodiment, a signal input by the transmitting-receiving channel 131 into the signal processor 132 may be an intermediate-frequency signal. The signal processor 132 may further convert the frequency of the received intermediate-frequency signal to obtain a baseband signal. After being processed by the signal processor 132, two baseband signals in the M polarization direction and the D polarization direction are finally obtained.

In conclusion, the a pairs of transmitting-receiving channels 131 in the active module 13 in the first antenna apparatus can receive signals in two polarization directions of the b antenna elements; and the signal processor 132 can process the signals output by the a pairs of transmitting-receiving channels 131 to obtain two baseband signals in the two polarization directions. Therefore, the receiving performance gain accomplished by the first antenna element array 11, the first combiner-splitter 12, and the a pairs of transmitting-receiving channels 131 and the signal processor 132 in the active module 13 may be regarded as the receiving performance gain of 2 channels (each channel corresponds to one polarization direction of the b antenna elements). That is, the first antenna element array 11, the first combiner-splitter 12, and the a pairs of transmitting-receiving channels 131 and the signal processor 132 in the active module 13 can accomplish a 2R (Receive) receiving performance gain. The receiving performance gain may be embodied in the performance indexes such as transmit power of a terminal, coverage of a system, capacity of the system, and/or the signal-to-noise ratio of the system.

In the antenna system provided in this embodiment, the second antenna element array 21 and the second combiner-splitter 22 in the second antenna apparatus make up a passive antenna structure. The second combiner-splitter 22 set in the second antenna apparatus combines the signals received by the multiple antenna elements in the second antenna element array 21. In this embodiment, at least one pair of receiving channels 3 are set in each second antenna apparatus in the antenna system. Each pair of receiving channels 3 are configured to receive signals in two different polarization directions, where the signals are combined by the second combiner-splitter 22, and then input the received signals into the active module 13 in the first antenna apparatus to perform frequency translation on the signals to obtain baseband signals. Through the at least one pair of receiving channels 3, the signals in two polarization directions of multiple antenna elements in the second antenna element array 21 can be received, and the active module 13 can process the signals output by the at least one pair of receiving channels 3 to obtain two baseband signals in two polarization directions. Therefore, the receiving performance gain accomplished by the second antenna element array 21, the second combiner-splitter 22, the at least one pair of receiving channels 3, and the active module 13 may be regarded as the receiving performance gain of 2 channels (each channel corresponds to one polarization direction of the multiple antenna elements in the second antenna element array 21). That is, the second antenna element array 21, the second combiner-splitter 22, the at least one pair of receiving channels 3, and the active module 13 can accomplish a 2R (Receive) receiving performance gain. Therefore, in the antenna system provided in this embodiment, the first antenna element array 11, the first combiner-splitter 12, and the active module 13 in the first antenna apparatus can accomplish a 2-channel receiving performance gain. The second antenna element array 21, the second combiner-splitter 22, and the at least one pair of receiving channels 3 in the second antenna apparatus, and the active module 13 in the first antenna apparatus can accomplish a 2-channel receiving performance gain. In this way, the antenna system provided in this embodiment can accomplish a 4-channel receiving performance gain or more, namely, a 4R receiving performance gain or a more than 4R receiving performance gain.

It should be noted that the signals received by the antenna system generally have multiple paths, and mutual interference exists between the multiple paths. It is assumed that the signals received by the antenna system have 4 paths. If only the first antenna apparatus can implement 2-channel receiving (each channel corresponds to one polarization direction of b antenna elements), then each channel of the first antenna apparatus corresponds to signals on 2 paths, and interference exists between the signals of the two paths, which deteriorates the system performance indexes such as a signal-to-noise ratio.

In the antenna system provided in this embodiment, based on the case that the first antenna apparatus can implement 2-channel receiving, the second antenna element array 21 and the second combiner-splitter 22 in the second antenna apparatus, at least one pair of receiving channels 3, and the active module 13 in the first antenna apparatus can implement 2-channel receiving (each channel corresponds to one polarization direction of multiple antenna elements in the second antenna element array 21). It is assumed that the signals received by the antenna system have 4 paths. Each channel implemented by the first antenna apparatus, the second antenna apparatus, at least one pair of receiving channels 3, and each channel implemented by the active module 13 in the first antenna apparatus need to correspond to the signals of only 1 path, which improves the system performance indexes such as a signal-to-noise ratio. Evidently, with more channels implemented by the antenna system, a better receiving performance gain of the system is accomplished.

The description above illustrates the 4-channel or more-channel receiving performance gain accomplished herein as against the existing 2-channel receiving performance gain by taking the system signal-to-noise ratio as an example. In fact, compared with the 2-channel receiving, 4-channel receiving or the receiving of more channels can accomplish smaller transmit power of a terminal, better coverage of a system, and greater capacity of the system, which are not detailed here any further.

As a practicable implementation manner, the second combiner-splitter 22 may be an existing combining-dividing network applied to passive antennas. The combining-dividing network is generally called a passive combining-dividing network. The passive combining-dividing network may combine the signals received by the multiple antenna elements in the second antenna element array 21 into two signals, each of which corresponds to one polarization direction of multiple antenna elements in the second antenna element array 21. For example, if each antenna element in the second antenna element array 21 receives signals in two polarization directions, where the two polarization directions are a +45° angle and a −45° angle against the horizontal plane, then the second combiner-splitter 22 can combine the signals received by the antenna elements in the +45° polarization direction against the horizontal plane among all antenna elements in the second antenna element array 21 into one signal, and combine the signals received by the antenna elements in the −45° polarization direction against the horizontal plane among all the antenna elements in the second antenna element array 21 into another one signal.

In such an implementation scenario, each second antenna apparatus may correspond to one pair of receiving channels 3. One receiving channel 3 in the pair of receiving channels 3 is configured to receive 1 path of signals obtained as a result of combining by the second combiner-splitter 22, and the one signal may be, for example, the one signal obtained as a result of combining the signals received by the antenna elements in the +45° polarization direction against the horizontal plane among all the antenna elements in the second antenna element array 21. The other receiving channel 3 is configured to receive the other one signal obtained as a result of combining by the second combiner-splitter 22, and the one signal may be, for example, the one signal obtained as a result of combining the signals received by the antenna elements in the −45° polarization direction against the horizontal plane among all the antenna elements in the second antenna element array 21.

The pair of receiving channels 3 may input the received signals into the active module 13 in the first antenna apparatus to perform frequency translation on the signals to obtain two baseband signals. Therefore, the second antenna element array 21 and the second combiner-splitter 22 in each second antenna apparatus, at least one pair of receiving channels 3, and the active module 13 in the first antenna apparatus can accomplish a 2-channel receiving performance gain, namely, a 2R receiving performance gain.

It should be noted that the receiving channel 3 mentioned herein may be an existing receiving channel, and the existing receiving channel 3 may perform analog-to-digital conversion and down-conversion on a received signal to obtain an intermediate-frequency signal. Therefore, in this embodiment, a signal input by the receiving channel 3 into the active module 13 may be an intermediate-frequency signal. The signal processing part in the active module 13, for example, the signal processor 132 shown in FIG. 3, may perform further frequency conversion on the intermediate-frequency signal input by the receiving channel 3 to obtain a baseband signal.

Evidently, in this scenario, a passive combining-dividing network (namely, an existing combining-dividing network applied to passive antennas) may be set in the second antenna apparatus, and one pair of receiving channels 3 are set in each second antenna apparatus, and therefore, the second antenna element array 21 in each second antenna apparatus, the passive combining-dividing network, the pair of receiving channels 3, and the active module 13 in the first antenna apparatus can accomplish a 2-channel receiving performance gain. In the antenna system provided in this embodiment, one or more second antenna apparatuses can be set. Therefore, at least one second antenna apparatus and the first antenna apparatus can accomplish a 4-channel receiving performance gain or more, namely, a 4R receiving performance gain or more than the 4R receiving performance gain.

As another practicable implementation manner, the second combiner-splitter 22 may employ combining-dividing components similar to those of the first combiner-splitter 12 in the first antenna apparatus. For example, the second combiner-splitter 22 may be composed of existing 2m-to-n combining-dividing networks, or composed of one 2m-to-2n combining-dividing network. It is assumed that the second antenna element array 21 includes n antenna elements, and a signal received by every antenna element may be input into the second combiner-splitter 22 as one signal. That is, in the second antenna element array 21, a total of 2n signals are input into the second combiner-splitter 22. In the 2n signals, n signals correspond to one of the two different polarization directions of the n antenna elements, and the other n signals correspond to one of the two different polarization directions of the n antenna elements. After receiving the 2n signals, the second combiner-splitter 22 combines the n signals in one polarization direction in the 2n signals into m signals and output the m signals, and combines the other n signals in the other polarization direction into the other m signals and output the other m signals. That is, in the 2m signals obtained as a result of combining by the second combiner-splitter 22, the m signals correspond to one of the two different polarization directions of the n antenna elements, and the other m signals correspond to one of the two different polarization directions of the n antenna elements, where m and n are integers greater than 1, m is smaller than n, and the ratio of m to n is not a fixed value, and may be determined in view of a tradeoff between the performance indexes (such as the coverage performance and gain) of the antenna and the implementation costs.

It should be noted that the number of antenna elements included in the first antenna element array 11 is generally the same as the number of antenna elements included in the second antenna element array 21, namely, n is generally equal to b, but m may be the same as or different from a.

In this scenario, each receiving channel 3 is configured to receive one signal in the 2m signals. Therefore, receiving channels 3 need to be set in pairs. Each pair of receiving channels 3 correspond to two signals in two different polarization directions in the 2m signals, and each pair of receiving channels 3 are configured to receive two signals in two different polarization directions in the 2m signals. Therefore, m pairs of receiving channels 3 may be set in each second antenna apparatus. Each of the m pairs of receiving channels 3 includes a receiving channel in an M polarization direction, expressed as RX_M, and a receiving channel in a D polarization direction, expressed as RX_D. The m pairs of receiving channels may be: RX_M1 and RX_D1, RX_M2 and RX_D2, . . . , RX_Mm and RX_Dm.

Each of the m pairs of receiving channels 3 receive two signals obtained as a result of combining by the second combiner-splitter 22, and then input them into the active module 13 in the first antenna apparatus to perform frequency translation on the signals to obtain baseband signals. The receiving channel 3 may be an existing receiving channel, and the existing receiving channel 3 may perform analog-to-digital conversion and down-conversion on a received signal to obtain an intermediate-frequency signal. Therefore, in this embodiment, a signal input by the receiving channel 3 into the active module 13 may be an intermediate-frequency signal. The signal processing part in the active module 13, for example, the signal processor 132 shown in FIG. 3, may perform further frequency conversion on the intermediate-frequency signals input by the receiving channel 3 to obtain two baseband signals in the M polarization direction and the D polarization direction.

Optionally, the active module 13 is further configured to perform beam forming on the signals combined by the first combiner-splitter 12 and the signals received by at least one pair of receiving channels 3. The active module 13 may use various existing methods to perform beam forming on the signals combined by the first combiner-splitter 12 and the signals received by at least one pair of receiving channels 3, for example, perform beam forming in an analog domain, or perform beam forming in a digital domain.

Evidently, in this scenario, a second combiner 22 (composed of two m-to-n combining-dividing networks, or composed of one 2m-to-2n combining-dividing network) and m pairs of receiving channels 3 may be set in the second antenna apparatus, and therefore, the second antenna element array 21 in each second antenna apparatus, the m-to-n combining-dividing networks, the m pairs of receiving channels 3, and the active module 13 in the first antenna apparatus can accomplish a 2-channel receiving performance gain. In the antenna system provided in this embodiment, one or more second antenna apparatuses can be set. Therefore, at least one second antenna apparatus and the first antenna apparatus can accomplish a 4-channel receiving performance gain or more, namely, a 4R receiving performance gain or more than the 4R receiving performance gain.

Through the antenna system provided in this embodiment, in the antenna system composed of an active antenna element array and a passive antenna element array, a combiner-splitter combines the signals received by the passive antenna element array in different polarization directions, and at least one pair of receiving channels are used to receive the signals, and then frequency translation is performed on the signals received by the receiving channels to obtain baseband signals. In the antenna system, the signals in different polarization directions in the passive antenna element array are received, and frequency translation is performed on the signals. Therefore, the antenna system composed of the active antenna element array and the passive antenna element array can accomplish a 4-channel receiving performance gain or more, namely, accomplish a 4R receiving performance gain or more than the 4R receiving performance gain, thereby increasing the receiving performance gain of the system.

Figure 4:
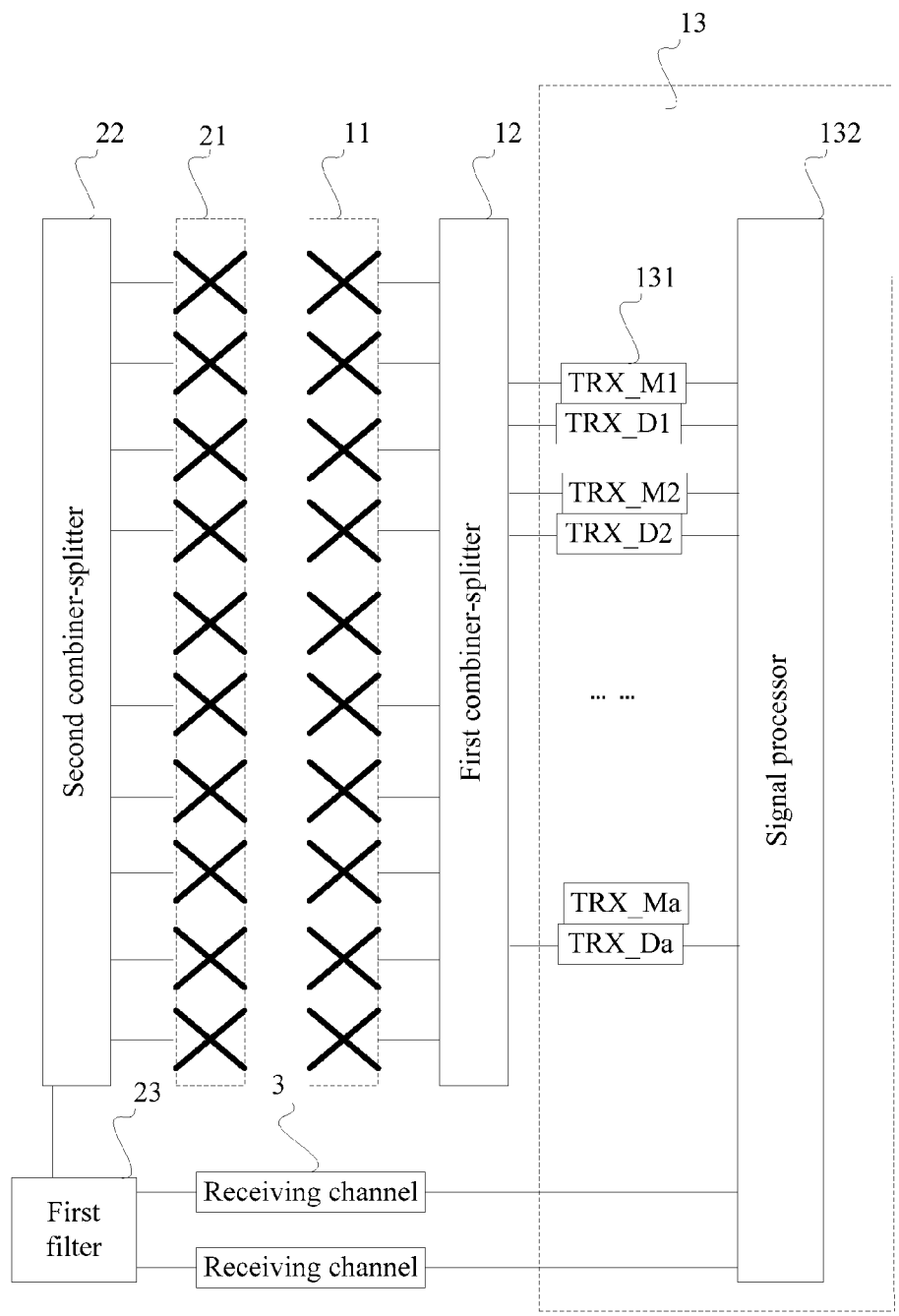
FIG. 4 is a schematic structural diagram of an antenna system according to another embodiment of the present invention.

FIG. 4 is a schematic structural diagram of an antenna system according to another embodiment of the present invention. As shown in FIG. 4, an existing combining-dividing network applied to passive antennas is set in a second antenna apparatus, namely, a passive combining-dividing network, and one pair of receiving channels are set in each second antenna apparatus, and therefore, a second antenna element array 21 in each second antenna apparatus, the passive combining-dividing network, the pair of receiving channels 3, and an active module 13 in a first antenna apparatus can accomplish a 2-channel receiving performance gain, as detailed below:

In this scenario, a second combiner-splitter 22 is specifically configured to: combine the signals received by multiple antenna elements in the second antenna element array 21 into two signals, each of which corresponds to one polarization direction of the multiple antenna elements in the second antenna element array 21.

Correspondingly, each second antenna apparatus corresponds to one pair of receiving channels 3, and is configured to receive the two signals obtained as a result of combining by the second combiner-splitter 22.

The second combiner-splitter 22 may be an existing passive combining-dividing network. The passive combining-dividing network may combine the signals received by the multiple antenna elements in the second antenna element array 21 into two signals, each of which corresponds to one polarization direction of the multiple antenna elements in the second antenna element array 21. It is assumed that in the second antenna element array 21, each antenna element receives signals in an M polarization direction and a D polarization direction. The second combiner-splitter 22 may combine the signals received in the M polarization direction by all antenna elements in the second antenna element array 21 into one signal, and combine the signals received in the D polarization direction by all antenna elements in the second antenna element array 21 into another one signal. In such an implementation scenario, the second antenna apparatus may correspond to one pair of receiving channels 3. One receiving channel 3 in the pair of receiving channels 3 is configured to receive one signal obtained as a result of combining by the second combiner-splitter 22, and the one signal may be, for example, the one signal obtained as a result of combining the signals received in the M polarization direction by the corresponding antenna elements in the second antenna element array 21. The other receiving channel 3 is configured to receive the other one signal obtained as a result of combining by the second combiner-splitter 22, and the 1 path of signals may be, for example, the one signal obtained as a result of combining the signals received in the D polarization direction by the corresponding antenna elements in the second antenna element array 21.

One pair of receiving channels 3 may be existing receiving channels, and may perform analog-to-digital conversion and down-conversion on a received signal to obtain an intermediate-frequency signal. Therefore, a signal input by a receiving channel 3 into the active module 13 may be an intermediate-frequency signal. The signal processing part in the active module 13, for example, the signal processor 132 shown in FIG. 3, may convert the frequency of the intermediate-frequency signal input by the receiving channel 3 to obtain two baseband signals. Therefore, the second antenna element array 21 in each second antenna apparatus, the passive combining-dividing network, one pair of receiving channels 3, and the active module 13 in the first antenna apparatus can accomplish a 2-channel receiving performance gain.

Based on the case that the passive combining-dividing network set in each second antenna apparatus and one corresponding pair of receiving channels 3 set in each second antenna apparatus implement 2R receiving in two polarization directions of the second antenna element array 21, the second antenna apparatus may be connected, as a passive antenna, to modules such as an RRU.

In this scenario, optionally, the signals, which multiple antenna elements in a first antenna element array 11 are capable to receive, may be set as first frequency band signals, and the signals, which the multiple antenna elements in the second antenna element array 21 are capable to receive, may be set as second frequency band signals, where the second frequency band includes the first frequency band and covers wider than the first frequency band.

Signal band received by the second antenna element array 21 includes signal band received by the first antenna element array 11. Therefore, the first frequency band signals may be acquired by filtering the two signals obtained as a result of combining by the second combiner-splitter 22 and output into one pair of receiving channels 3 to implement 2R receiving in two polarization directions of the second antenna element array 21. In the two signals obtained and output as a result of combining by the second combiner-splitter 22, the signals other than the first frequency band signals are output to modules such as an RRU so that the second antenna apparatus can serve as a passive antenna.

Accordingly, as a practicable implementation manner, as shown in FIG. 4, at least one first filter 23 may be set in the second antenna apparatus. The at least one filter 23 may be set between the second combiner-splitter and one pair of transmitting-receiving channels 3, and is configured to filter the two signals obtained as a result of combining by the second combiner-splitter 22 to acquire the first frequency band signals, and output the first frequency band signals to one pair of receiving channels 3 corresponding to the second antenna apparatus.

Optionally, one first filter 23 may be set, and two input ports and two output ports may be set on each first filter 23. Each input port receives one signal obtained as a result of combining by the second combiner-splitter 22, and each output port is configured to input one signal acquired by filtering into a receiving channel 3.

Optionally, two first filters 23 may be set, and an input port and an output port may be set on each first filter 23, and are configured to receive one signal obtained as a result of combining by the second combiner-splitter 22, and input one signal acquired by filtering into a receiving channel 3.

Further, the at least one first filter 23 may output all or part of the signals other than the first frequency band signals of the two signals obtained as a result of combining by the second combiner-splitter 22 to an RRU, an RRU module or a non-distributed base station so that the second antenna apparatus can serve as a passive antenna.

As another practicable implementation manner, at least one second filter may be set between the second antenna element array 21 and the second combiner-splitter 22, and is configured to filter the signals received by n antenna elements to acquire first frequency band signals, and output the first frequency band signals to the second combiner-splitter 22. The second filter may be an existing resonator filter.

Optionally, the number of second filters may be the same as the number of the antenna elements. That is, n second filters are set, two input ports and two output ports may be set on each second filter, and the second filters are configured to receive the signals received in two polarization directions by one antenna element in the second antenna element array 21, filter in the received signals to acquire the first frequency band signals, and output the first frequency band signals to the second combiner-splitter 22, so that the first frequency band signals are combined by the second combiner-splitter 22.

Optionally, 2n second filters may be set, and an input port and an output port may be set on each second filter. Each second filter is configured to receive the signals received in one polarization direction by one antenna element in the second antenna element array 21, filter the received signals to acquire the first frequency band signals, and output the first frequency band signals to the second combiner-splitter 22, so that the first frequency band signals are combined by the second combiner-splitter 22.

Optionally, one second filter may be set, and 2n input ports and 2n output ports may be set on the second filter. The second filter is configured to receive the signals received in two polarization directions by n antenna elements, filter the received signals to acquire the first frequency band signals, and output the first frequency band signals to the second combiner-splitter 22, so that the first frequency band signals are combined by the second combiner-splitter 22.

Described above are only several optional setting manners of a second filter. It is understandable that the number of second filters and the setting of the ports of the second filters may come in many other manners, and the manners described above shall not be construed as a limitation on the present invention.

Further, at least one second filter may output all or part of the signals other than the first frequency band signals of received signals, so that the second antenna apparatus can serve as a passive antenna. In this scenario, a third combiner-splitter may be set in the second antenna apparatus. The third combiner-splitter may be an existing passive combining-dividing network, and the third combiner-splitter may combine all or part of the signals other than the first frequency band signals of the signals output by the at least one second filter into two signals, each of which may correspond to one polarization direction of the n antenna elements; the third combiner-splitter may output the two signals obtained as a result combining to an RRU, an RRU module or a non-distributed base station so that the second antenna apparatus can serve as a passive antenna.

Optionally, the antenna system may further include: a remote radio unit (not illustrated in the figure). The remote radio unit is configured to receive all or part of the signals other than the first frequency band signals of the two signals output by the first filter 23 or the third combiner-splitter, perform frequency translation on the received two signals to obtain two baseband signals, and send the baseband signals to a baseband unit through a digital interface.

Through the antenna system provided in this embodiment, a passive combining-dividing network is set in each second antenna apparatus, and one pair of receiving channels are set on each second antenna apparatus, so as to implement 2R receiving in two polarization directions of the second antenna element array and accomplish a 4R receiving performance gain or a more-than 4R receiving performance gain. Further, in this embodiment, the signals, which the multiple antenna elements in the first antenna element array are capable to receive, may be set as first frequency band signals, and the signals, which the multiple antenna elements in the second antenna element array are capable to receive, may be set as second frequency band signals, where the second frequency band includes the first frequency band and covers wider than the first frequency band. At least one first filter is set between the second combiner-splitter and one pair of receiving channels; the first filter is configured to filter the two signals obtained as a result of combining by the second combiner-splitter to acquire first frequency band signals and output the first frequency band signals into one pair of receiving channels to implement 2R receiving on the first frequency band signals in two polarization directions of the second antenna element array. In the two signals obtained and output as a result of combining by the second combiner-splitter, all or part of the signals other than the first frequency band signals may be output to an RRU or non-distributed base station so that the second antenna apparatus can serve as a passive antenna. Alternatively, at least one second filter may be set between the second antenna element array and the second combiner-splitter, the second filter is configured to output all or part of signals other than the first frequency band signals of the signals output by multiple antenna elements, and then the signals are combined by a third combiner-splitter into two signals and output to an RRU or a non-distributed base station so that the second antenna apparatus can serve as a passive antenna.

Figure 5:
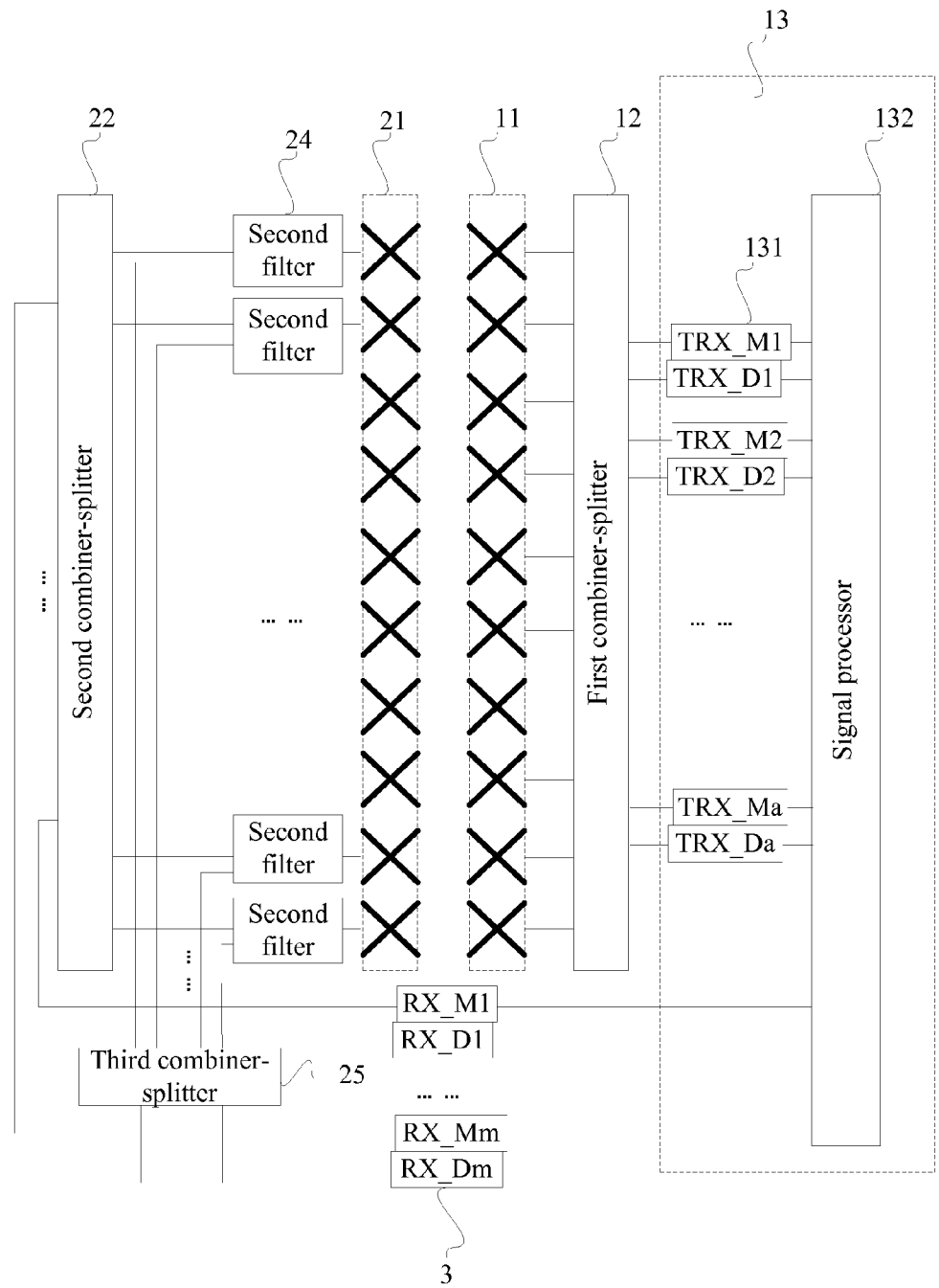
FIG. 5 is a schematic structural diagram of an antenna system according to another embodiment of the present invention.

FIG. 5 is a schematic structural diagram of an antenna system according to another embodiment of the present invention. As shown in FIG. 5, the scenario of this embodiment is: An m-to-n combining-dividing network is set in a second antenna apparatus, and m pairs of receiving channels are set in each second antenna apparatus to implement 2R receiving in two polarization directions of the second antenna element array, and therefore, a second antenna element array 21 in each second antenna apparatus, the m-to-n combining-dividing network, the m pairs of receiving channels 3, and an active module 13 in the first antenna apparatus can accomplish a 2-channel receiving performance gain.

In this scenario, a second combiner-splitter 22 is configured to combine 2n signals received by n antenna elements in the second antenna element array 21 into 2m signals; n signals of the 2n signals and m signals of the 2m signals correspond to one of the two different polarization directions of the n antenna elements; the other n signals and the other m signals correspond to one of the two different polarization directions of the n antenna elements, where n and m are integers greater than 1, and m is smaller than or equal to n.

Correspondingly, the m pairs of receiving channels 3 may be set in each second antenna apparatus, each pair of receiving channels 3 correspond to two signals, in two different polarization directions, of the 2m signals, and each pair of receiving channels 3 are configured to receive two signals, in two different polarization directions, of the 2m signals.

The second combiner-splitter 22 may employ combining-dividing components similar to those of the first combiner-splitter 12 in the first antenna apparatus. The second combiner-splitter 22 may be composed of existing 2m-to-n combining-dividing networks, or composed of an existing 2m-to-2n combining-dividing network. It is assumed that the second antenna element array 21 includes n antenna elements, and a signal received by every antenna element in one polarization direction may be input into the second combiner-splitter 22 as one signal. That is, in the second antenna element array 21, a total of 2n signals are input into the second combiner-splitter 22. In the 2n signals, n signals correspond to one of the two different polarization directions of the n antenna elements, and the other n signals correspond to one of the two different polarization directions of the n antenna elements. After receiving the 2n signals, the second combiner-splitter 22 combines the n signals in one polarization direction into m signals and output the m signals, and combines the other n signals in the other polarization direction into the other m signals and output the other m signals, where m and n are integers greater than 1, m is smaller than n, and the ratio of m to n is not a fixed value, and may be determined in view of a tradeoff between the performance indexes of the antenna and the implementation costs.

Each receiving channel 3 is configured to receive one signal in the 2m signals. Therefore, receiving channels 3 need to be set in pairs. Each pair of receiving channels 3 correspond to two signals, in two different polarization directions, of the 2m signals, and each pair of receiving channels 3 are configured to receive two signals, in two different polarization directions, of the 2m signals. Therefore, m pairs of receiving channels 3 may be set in each second antenna apparatus. Each of the m pairs of receiving channels 3 includes a receiving channel in an M polarization direction, expressed as RX_M, and a receiving channel in a D polarization direction, expressed as RX_D. The m pairs of receiving channels are: RX_M1 and RX_D1, RX_M2 and RX_D2, ..., RX_Mm and RX_Dm.

Each of the m pairs of receiving channels 3 are existing receiving channels, and may perform analog-to-digital conversion and down-conversion on a received signal to obtain an intermediate-frequency signal. Therefore, a signal input by the receiving channel 3 into the active module 13 may be an intermediate-frequency signal. The signal processing part in the active module 13, for example, the signal processor 132 shown in FIG. 3, may perform further frequency conversion on the intermediate-frequency signals input by the receiving channel 3 to obtain two baseband signals.

In this scenario, 2m-to-n combining-dividing network or a 2m-to-2n combining-dividing network are set in each second antenna apparatus, and m pairs of receiving channels 3 are set in each second antenna apparatus to implement 2R receiving in two polarization directions of the second antenna element array 21. The second antenna element array 21 in the second antenna apparatus, the m-to-n combining-dividing network, the m pairs of receiving channels 3, and the active module 13 in the first antenna apparatus can accomplish a 2-channel receiving performance gain.

Like the embodiment shown in FIG. 4, the second antenna apparatus may serve as a passive antenna, for example, by connecting to an RRU or a non-distributed base station.

In this scenario, optionally, the signals, which multiple antenna elements in the first antenna element array 11 are capable to receive, may be set as first frequency band signals, and the signals, which multiple antenna elements in the second antenna element array 21 are capable to receive, may be set as second frequency band signals, where the second frequency band includes the first frequency band and covers wider than the first frequency band. Signal band received by the second antenna element array 21 includes signal band received by the first antenna element array 11. Therefore, the first frequency band signals of the signals output by each antenna element in the second antenna element array 21 may be obtained by filtering, and the first frequency band signals are input into the second combiner-splitter 22, and therefore, all the 2n signals input into the second combiner-splitter 22 are located in the first frequency band, and all the 2m signals obtained as a result of combining by the second combiner-splitter 22 are also located in the first frequency band, thereby implementing 2R receiving in two polarization directions of the second antenna element array 21. Further, all or part of signals other than the first frequency band signals of signals output by each antenna element in the second antenna element array 21 may be output to an RRU, an RRU module, or a non-distributed base station so that the second antenna apparatus can serve as a passive antenna.

Accordingly, as shown in FIG. 5, as a practicable implementation manner, at least one second filter 24 may be set in the second antenna apparatus, and is configured to filter the signals received by n antenna elements to acquire first frequency band signals, and output the first frequency band signals to the second combiner-splitter 22. The second filter 24 may be an existing resonator filter.

Optionally, as shown in FIG. 5, the number of second filters 24 may be equal to the number of the antenna elements in the second antenna element array 21. That is, n second filters 24 are set, two input ports and two output ports may be set on each second filter, and the second filters are configured to receive the signals received in two polarization directions by one antenna element in the second antenna element array 21, filter the received signals to acquire the first frequency band signals, and output the first frequency band signals to the second combiner-splitter 22, so that the first frequency band signals are combined by the second combiner-splitter 22.

Optionally, 2n second filters 24 may be set, and an input port and an output port may be set on each second filter 24. Each second filter 24 is configured to receive the signals received in one polarization direction by one antenna element in the second antenna element 21, filter the received signals to acquire the first frequency band signals, and output the first frequency band signals to the second combiner-splitter 22, so that the first frequency band signals are combined by the second combiner-splitter 22.

Optionally, one second filter 24 may be set, and 2n input ports and 2n output ports may be set on the second filter 24. The second filter is configured to receive the signals received in two polarization directions by n antenna elements, filter the received signals to acquire the first frequency band signals, and output the first frequency band signals to the second combiner-splitter 22, so that the first frequency band signals are combined by the second combiner-splitter 22.

Described above are only several optional setting manners of a second filter. It is understandable that the number of second filters and the setting of the ports of the second filters may come in many other manners, which are not detailed here any further.

Further, at least one second filter 24 is further configured to: output all or part of signals other than the first frequency band signals of the received signals.

Optionally, a third combiner-splitter 25 may be set in the second antenna apparatus. The third combiner-splitter 25 is configured to combine all or part of signals other than the first frequency band signals of the signals output by the at least one second filter 24 into two signals, which are then output to an RRU, an RRU module or a non-distributed base station. Each of the two signals corresponds to one polarization direction of the n antenna elements so that the second antenna apparatus can serve as a passive antenna.

As another practicable implementation manner, at least one second filter 24 may be set in the second antenna apparatus, and is configured to filter the 2m signals obtained as a result of combining by the second combiner-splitter 22 to acquire first frequency band signals, and output the first frequency band signals to m pairs of receiving channels 3.

Optionally, the number of second filters 24 may be m, and two input ports and two output ports may be set on each second filter 24. The second filter is configured to receive two signals, in different polarization directions, of the 2m signals obtained as a result of combining by the second combiner-splitter 22, filter the received signals to acquire the first frequency band signals, and output the first frequency band signals to one pair of receiving channels 3 in the m pairs of receiving channels 3.

Optionally, 2m second filters 24 may be set, and one input port and one output port may be set on each second filter 24. The second filter is configured to receive one signal in the 2m signals obtained as a result of combining by the second combiner-splitter 22, filter the received signals to acquire the first frequency band signals, and output the first frequency band signals to one receiving channel 3 in the m pairs of receiving channels 3.

Optionally, one second filter 24 may be set, and 2m input ports and 2m output ports may be set on the second filter 24. The second filter is configured to receive 2m signals obtained as a result of combining by the second combiner-splitter 22, filter the received signals to acquire the first frequency band signals, and output the first frequency band signals to m pairs of receiving channels 3.

Described above are only several optional setting manners of the second filter. It is understandable that the number of second filters and the setting of the ports of the second filters may come in many other manners, which are not detailed here any further.

Further, in this scenario, the at least one second filter 24 is further configured to: output all or part of signals other than the first frequency band signals of the 2m signals obtained as a result of combining by the second combiner-splitter 22.

Optionally, a third combiner-splitter 25 may be set in the second antenna apparatus. The third combiner-splitter 25 is configured to combine all or part of signals other than the first frequency band signals of the 2m signals output by the at least one second filter 24 into two signals, which are then output to an RRU, an RRU module or a non-distributed base station so that the second antenna apparatus can serve as a passive antenna.

Optionally, the antenna system may further include: a remote radio unit (not illustrated in the figure). The remote radio unit is configured to receive all or part of signals other than the first frequency band signals of the two signals output by the third combiner-splitter 25, perform frequency translation on the received two signals to obtain two baseband signals, and send the baseband signals to the baseband unit through a digital interface.

Through the antenna system provided in this embodiment, 2m-to-n combining-dividing networks or a 2m-to-2n combining-dividing network may be set in each second antenna apparatus, and m pairs of receiving channels are set in each second antenna apparatus, so as to implement receiving in two polarization directions of the second antenna element array and accomplish a 4R receiving performance gain or a more-than 4R receiving performance gain. Further, in this embodiment, the signals, which multiple antenna elements in the first antenna element array are capable to receive, may be set as first frequency band signals, and the signals, which multiple antenna elements in the second antenna element array are capable to receive, may be set as second frequency band signals, where the second frequency band includes the first frequency band and covers wider than the first frequency band. At least one second filter is set between the second antenna element array and the second combiner-splitter, or, at least one second filter is set between the second combiner-splitter and the receiving channel to filter the signals received by each antenna element in the second antenna element array or the signals output by the second combiner-splitter to acquire first frequency band signals, so as to implement 2R receiving on the first frequency band signals in two polarization directions of the second antenna element array. Further, the signals on other bands than the first frequency band signals of the signals received by at least one second filter may be output, and combined by the third combiner-splitter to obtain two signals, which are then output to an RRU, an RRU module or a non-distributed base station so that the second antenna apparatus can serve as a passive antenna.

The embodiments shown in FIG. 2-FIG. 5 deal with the scenario that the antenna system includes one second antenna apparatus. In the case that the antenna system includes multiple second antenna apparatuses, for the structure and the functions of each second antenna apparatuses, refer to the description in the foregoing embodiments.

Further, a base station system is provided in an embodiment of the present invention. The base station system includes an antenna system. The antenna system includes: a first antenna apparatus, at least one second antenna apparatus, and at least one pair of receiving channels;

The first antenna apparatus includes: a first antenna element array, a first combiner-splitter, and an active module; the second antenna apparatus includes: a second antenna element array and a second combiner-splitter;

The first antenna element array includes multiple antenna elements, and it is the same with the second antenna element array, where the antenna elements are configured to receive and transmit signals in two different polarization directions;

The first combiner-splitter is configured to combine, in the two different polarization directions, signals, where the signals are received by the multiple antenna elements in the first antenna element array;

The active module is configured to receive the signals combined by the first combiner-splitter, and perform frequency translation on the signals combined by the first combiner-splitter in two different polarization directions to obtain baseband signals;

The second combiner-splitter is configured to combine, in the two different polarization directions, signals, where the signals are received by the multiple antenna elements in the second antenna element array;

Each second antenna apparatus corresponds to the at least one pair of receiving channels, and the at least one pair of receiving channels are configured to receive the signals combined by the second combiner-splitter in the two different polarization directions; and The active module is further configured to perform frequency translation on the signals received by the at least one pair of receiving channels to obtain baseband signals.

As a practicable implementation manner, the second combiner-splitter is configured to combine 2n signals received by n antenna elements in the second antenna element array into two signals, where n signals of the 2n signals correspond to one of the two different polarization directions, the other n signals correspond to one of the two different polarization directions, and each of the two signals corresponds to one polarization direction, where n is an integer greater than 1; and Each second antenna apparatus may correspond to one pair of receiving channels, and is configured to receive the two signals obtained as a result of combining by the second combiner-splitter.

Optionally, the signals received by multiple antenna elements in the first antenna element array may be located in a first frequency band, and the signals received by multiple antenna elements in the second antenna element array may be located in a second frequency band, where the second frequency band includes the first frequency band and covers wider than the first frequency band.

Optionally, at least one first filter may be set in the second antenna apparatus, and is configured to filter the two signals obtained as a result of combining by the second combiner-splitter to acquire first frequency band signals, and output the first frequency band signals to one pair of receiving channels corresponding to the second antenna apparatus.

The at least one first filter is further configured to output all or part of signals other than the first frequency band signals of the two signals obtained as a result of combining by the second combiner-splitter.

Optionally, the base station system provided in this embodiment may further include:

a remote radio unit, configured to receive all or part of the two signals output by at least one first filter in the antenna system, perform frequency translation on the received two signals to obtain two baseband signals, and send the baseband signals to a baseband unit through a digital interface.

Optionally, the base station system provided in this embodiment may further include:

a non-distributed base station, configured to receive all or part of the two signals output by at least one first filter in the antenna system, perform frequency translation on the received two signals to obtain two baseband signals, and send the baseband signals to a baseband unit through a digital interface.

As a practicable implementation manner, the second combiner-splitter is further configured to combine 2n signals received by n antenna elements in the second antenna element array into 2m signals, where n signals of the 2n signals correspond to one of the two different polarization directions, the other n signals correspond to one of the two different polarization directions, m signals of the 2m signals correspond to one of the two different polarization directions, the other m signals correspond to one of the two different polarization directions, where n and m are integers greater than 1, and m is smaller than or equal to n;

Each second antenna apparatus corresponds m pairs of receiving channels 3, each pair of receiving channels may correspond to two signals, in two different polarization directions, of the 2m signals, and each pair of receiving channels are configured to receive two signals, in two different polarization directions, of the 2m signals.

Optionally, the signals received by multiple antenna elements in the first antenna element array may be located in a first frequency band, and the signals received by multiple antenna elements in the second antenna element array may be located in a second frequency band, where the second frequency band includes the first frequency band and covers wider than the first frequency band.

At least one second filter may be set in the second antenna apparatus, and is configured to filter the signals received by n antenna elements to acquire first frequency band signals, and output the first frequency band signals to the second combiner-splitter. Alternatively, at least one second filter may be set in the second antenna apparatus, and is configured to filter the 2m signals obtained as a result of combining by the second combiner-splitter to acquire first frequency band signals, and output the first frequency band signals to m pairs of receiving channels.

Optionally, the at least one second filter is further configured to output all or part of signals other than the first frequency band signals of the received signals.

Optionally, a third combiner-splitter may be set in the second antenna apparatus, and is configured to combine all or part of signals other than the first frequency band signals of the signals output by the at least one second filter into two signals, each of which corresponds to one polarization direction.

In this scenario, the remote radio unit set in the base station system is further configured to receive all or part of the two signals output by the third combiner-splitter in the antenna system, and the two signals obtained as a result of combining all or part of signals other than the first frequency band signals.

In this embodiment, the non-distributed base station set in the base station system is further configured to receive all or part of the two signals output by the third combiner-splitter, perform frequency translation on the received two signals to obtain two baseband signals, and send the baseband signals to a baseband unit through a digital interface.

For the detailed structure and functions of the antenna system included in the base station system provided in this embodiment, see the antenna system embodiment described herein above; for the detailed connection manner between the antenna system and the RRU, see the relevant description in the antenna system embodiment.

Through the base station system provided in this embodiment, in the antenna system composed of an active antenna element array and a passive antenna element array, a combiner-splitter combines the signals received by the passive antenna element array, and at least one pair of receiving channels are used to receive the signals combined by the combiner in different polarization directions in the passive antenna element array, and then frequency translation is performed on the signals received by the receiving channels to obtain baseband signals. In the antenna system, the signals in different polarization directions in the passive antenna element array are received, and frequency translation is performed on the signals. Therefore, the antenna system composed of the active antenna element array and the passive antenna element array in the base station system can accomplish a 4-channel receiving performance gain or more, namely, accomplish a 4R receiving performance gain or more than the 4R receiving performance gain, thereby increasing the receiving performance gain of the system. Further, the passive antenna element array may serve as a passive antenna to meet requirements in different application scenarios.

Further, an embodiment of the present invention provides a communication system, and the system includes any base station system described above.

It is understandable that the 4-channel receiving manner or the receiving manner of more than 4 channels described above may change properly to implement 4-channel transmitting or transmitting of more than 4 channels. For example, in the implementation of the receiving manner, the signal division function of the first filter or the second filter, the signal division function of the second combiner-splitter, or the signal combination function of the third combiner-splitter is applied. Therefore, a corresponding variation may include: changing the corresponding receiving channel to a transmitting and receiving channel, using the signal combination function of the first filter or the second filter, the signal combination function of the second combiner-splitter, and/or the signal division function of the third combiner-splitter are applied. More other variations may apply. Because the transmitting process is generally a reverse process of the receiving process, the structure and the implementation manner are mutually citable between the transmitting process and the receiving process, and are not repeated herein.

Persons of ordinary skill in the art should understand that all or part of the steps of the method specified in any embodiment of the present invention may be implemented by a program instructing relevant hardware. The program may be stored in a computer readable storage medium. When the program runs, the program executes the steps of the method specified in any embodiment above. The storage medium may be any medium capable of storing program codes, such as a ROM, RAM, magnetic disk, or CD-ROM. The components and/or apparatuses mentioned herein may be stand-alone physically or integrated together. For example, the second combiner-splitter and the first filter may be physically the same combing-dividing network, or the second filter and the second combiner-splitter may be physically the same combining-dividing network.

Finally, it should be noted that the embodiments of the present invention are intended for describing the technical solution of the present invention other than limiting the present invention. Although the present invention is described in detail with reference to the foregoing embodiments, persons of ordinary skill in the art should understand that they can still make modifications to the technical solution described in the foregoing embodiments or make substitutions to some technical features thereof, without departing from the spirit and scope of the technical solution of the embodiments of the present invention.

What is claimed is:

1. An antenna system, comprising: a first antenna apparatus, and at least one pair of receiving channels, wherein:
    the first antenna apparatus comprises: a first antenna element array, a first combiner-splitter, and an active module;
    the first antenna element array comprises a plurality of antenna elements, wherein the antenna elements are configured to receive and transmit signals in two different polarization directions;
    the first combiner-splitter is configured to combine, in the two different polarization directions, signals wherein the signals are received by the plurality of antenna elements in the first antenna element array;
    the active module is configured to receive signals combined by the first combiner-splitter in the two different polarization directions, and to perform frequency translation on the signals combined by the first combiner-splitter to obtain baseband signals;
    the at least one pair of receiving channels are capable of being connected to a second antenna apparatus, wherein the second antenna apparatus is configured to output signals in the two different polarization directions, and the at least one pair of receiving channels are configured to receive signals output by the second antenna apparatus; and
    the active module is further configured to perform frequency translation on the signals received by the at least one pair of receiving channels to obtain baseband signals.

2. The antenna system according to claim 1, wherein the number of the at least one pair of receiving channels are m, which is an integer greater than or equal to 1, and each pair of the m pairs of receiving channels is configured to receive two signals of the signals output by the second antenna apparatus, one of which is in one of the two different polarization directions and the other one of which is in the other one of the two different polarization directions.

3. The antenna system according to claim 1, wherein the number of the plurality of antenna elements in the first antenna element array is b, the number of the signals received by the b antenna elements in the first antenna element array are 2b, and the first combiner-splitter is configured to combine 2b signals received by the b antenna elements in the first antenna element array into 2a signals, wherein b signals of the 2b signals and a signals of the 2a signals correspond to one of the two different polarization directions, the other b signals and the other a signals correspond to the other one of the two different polarization directions, wherein b is an integer greater than 1, a is an integer greater than or equal to 1 and a is smaller than or equal to b; and
    wherein the active module comprises: a pairs of transmitting-receiving channels and a signal processor;
    each pair of the a pairs of transmitting-receiving channels is configured to receive two signals of the 2a signals, one of which is in one of the two different polarization directions and the other one of which is in the other one of the two different polarization directions; and
    the signal processor is configured to perform frequency translation on signals received by the a pairs of transmitting-receiving channels and the signals received by the at least one pair of receiving channels to obtain baseband signals respectively.

4. The antenna system according to claim 1, wherein the active module is further configured to perform beam forming on the signals combined by the first combiner-splitter and the signals received by at least one pair of receiving channels.

5. The antenna system according to claim 1, wherein the antenna system further comprises the second antenna apparatus.

6. The antenna system according to claim 5, wherein the second antenna apparatus comprises a second antenna element array and a second combiner-splitter, wherein
    the second antenna element array comprises a plurality of antenna elements, wherein the antenna elements are configured to receive and transmit signals in two different polarization directions; and
    the second combiner-splitter is configured to combine, in the two different polarization directions, signals which are received by the plurality of antenna elements in the second antenna element array and to output the signals combined to the at least one pair of receiving channels.

7. The antenna system according to claim 6, wherein:
    the number of antenna elements in the second antenna element is n, and the number of the signals received by the n antenna elements in the second antenna element is 2n, and the second combiner-splitter is configured to combine 2n signals received by the n antenna elements in the second antenna element array into 2m signals, wherein n signals of the 2n signals and m signal in the 2m signals correspond to one of the two different polarization directions, the other n signals of the 2n signals and the other m signal in the 2m signals correspond to the other one of the two different polarization directions, wherein n is an integer greater than 1, m is an integer greater than or equal to 1 and m is smaller than or equal to n; and
    wherein the number of the signals output by the second combiner-splitter to the at least one pair of receiving channels is 2m and the number of the at least one pair of receiving channels is m pairs.

8. The antenna system according to claim 7, wherein:
    the signals received by the plurality of antenna elements in the first antenna element array are located in a first frequency band, and the signals received by the plurality of antenna elements in the second antenna element array are located in a second frequency band, wherein the second frequency band comprises the first frequency band and covers wider than the first frequency band;
    the second antenna apparatus further comprises at least one first filter, which is configured to filter the 2m signals obtained as a result of combining by the second combiner-splitter to acquire 2m signals of the first frequency band, and to output the 2m signals of the first frequency band to the m pairs of receiving channels corresponding to the second antenna apparatus.

9. The antenna system according to claim 8, wherein the at least one first filter is further configured to:
    output all or part of signals other than the signals of the first frequency band of the 2m signals obtained as a result of combining by the second combiner-splitter.

10. The antenna system according to claim 9, wherein m is equal to 1, and the antenna system further comprises:

a remote radio unit, configured to receive all or part of signals other than the signals of the first frequency band of the two signals output by the at least one first filter in the antenna system, and to perform frequency translation on the received two signals to obtain two baseband signals.

11. The antenna system according to claim 7, wherein:

the signals received by the plurality of antenna elements in the first antenna element array are located in a first frequency band, and the signals received by the plurality of antenna elements in the second antenna element array are located in a second frequency band, wherein the second frequency band comprises the first frequency band and covers wider than the first frequency band; and the second antenna apparatus further comprises: at least one second filter, configured to filter the 2n signals received by the n antenna elements to acquire 2n signals of the first frequency band, and to output the 2n signals of the first frequency band to the second combiner-splitter.

12. The antenna system according to claim 11, wherein the at least one second filter is further configured to:

output all or part of signals other than the signals of the first frequency band of the received 2n signals.

13. The antenna system according to claim 12, wherein the second antenna apparatus further comprises:

a third combiner-splitter, configured to combine all or part of signals other than the signals of the first frequency band of the 2n signals output by the at least one second filter into two signals, wherein one of the two signals corresponds to one of the two different polarization directions, and the other one of the two signals corresponds to the other one of the two different polarization directions.

14. The antenna system according to claim 13, further comprising:

a remote radio unit, configured to receive all or part of the two signals output by the third combiner-splitter, and to perform frequency translation on the received two signals to obtain two baseband signals.

15. A base station system, comprising an antenna system and a second antenna apparatus, wherein the antenna system comprises: a first antenna apparatus and at least one pair of receiving channels, wherein:

the first antenna apparatus comprises: a first antenna element array, a first combiner-splitter, and an active module;

the first antenna element array comprises a plurality of antenna elements, wherein the antenna elements are configured to receive and transmit signals in two different polarization directions;

the first combiner-splitter is configured to combine, in the two different polarization directions, signals wherein the signals are received by the plurality of antenna elements in the first antenna element array;

the active module is configured to receive signals combined by the first combiner-splitter in the two different polarization directions, and to perform frequency translation on the signals combined by the first combiner-splitter to obtain baseband signals;

the at least one pair of receiving channels are connected to the second antenna apparatus, wherein the second antenna apparatus is configured to output signals in the two different polarization directions, and the at least one pair of receiving channels are configured to receive signals output by the second antenna apparatus; and the active module is further configured to perform frequency translation on the signals received by the at least one pair of receiving channels to obtain baseband signals.

16. The base station system according to claim 15, wherein the second antenna apparatus comprises a second antenna element array and a second combiner-splitter, wherein the second antenna element array comprises a plurality of antenna elements, wherein the antenna elements are configured to receive and transmit signals in two different polarization direction; and the second combiner-splitter is configured to combine, in the two different polarization directions, signals which are received by the plurality of antenna elements in the second antenna element array and to output the signals combined to the at least one pair of receiving channels.

17. The base station system according to claim 16, wherein:

the signals received by the plurality of antenna elements in the first antenna element array are located in a first frequency band, and the signals received by the plurality of antenna elements in the second antenna element array are located in a second frequency band, wherein the second frequency band comprises the first frequency band and covers wider than the first frequency band;

the second antenna apparatus further comprises at least one first filter, which is configured to filter the signals obtained as a result of combining by the second combiner-splitter to acquire signals of the first frequency band, and to output the signals of the first frequency band to the at least one pair of receiving channels corresponding to the second antenna apparatus.

18. The base station system according to claim 17, wherein the at least one first filter is further configured to:

output all or part of signals other than the signals of the first frequency band of the signals obtained as a result of combining by the second combiner-splitter, wherein the signals obtained as a result of combining by the second combiner-splitter are two signals, each of which is in one of the two different polarization directions, and wherein the base station system further comprises:

a remote radio unit, configured to receive all or part of signals other than the signals of the first frequency band of the two signals output by the at least one first filter in the antenna system, and to perform frequency translation on the received two signals to obtain two baseband signals.

19. The base station system according to claim 16, wherein:

the signals received by the plurality of antenna elements in the first antenna element array are located in a first frequency band, and the signals received by the plurality of antenna elements in the second antenna element array are located in a second frequency band, wherein the second frequency band comprises the first frequency band and covers wider than the first frequency band;

the second antenna apparatus further comprises at least one second filter, which is configured to filter the 2n signals received by the n antenna elements in the second antenna apparatus to acquire 2n signals of the first frequency band, and to output the 2n signals of the first frequency band to the second combiner-splitter, wherein n is an integer greater than 1.

20. The base station system according to claim 19, wherein the at least one second filter is further configured to output all or part of signals other than the signals of the first frequency band of the received 2n signals; and wherein the second antenna apparatus further comprises:
a third combiner-splitter, configured to combine all or part of signals other than the signals of the first frequency band of the 2n signals output by the at least one second filter into two signals, wherein one of the two signals corresponds to one of the two different polarization directions, and the other one of the two signals corresponds to the other one of the two different polarization directions; and wherein the base station system further comprises:
a remote radio unit, configured to receive all or part of the two signals output by the third combiner-splitter, and to perform frequency translation on the received two signals to obtain two baseband signals.

* * * * *

UNITED STATES PATENT AND TRADEMARK OFFICE
CERTIFICATE OF CORRECTION

PATENT NO. : 8,588,856 B2
APPLICATION NO. : 13/718976
DATED : November 19, 2013
INVENTOR(S) : Liu et al.

It is certified that error appears in the above-identified patent and that said Letters Patent is hereby corrected as shown below:

Title page, item [71] Applicant's City of Residence "Guangdong (CN)" should read -- Shenzhen (CN) --.

Signed and Sealed this
Twentieth Day of May, 2014

Michelle K. Lee
*Deputy Director of the United States Patent and Trademark Office*